(No Model.)
W. LIKES.
NECK YOKE.
No. 411,458. Patented Sept. 24, 1889.
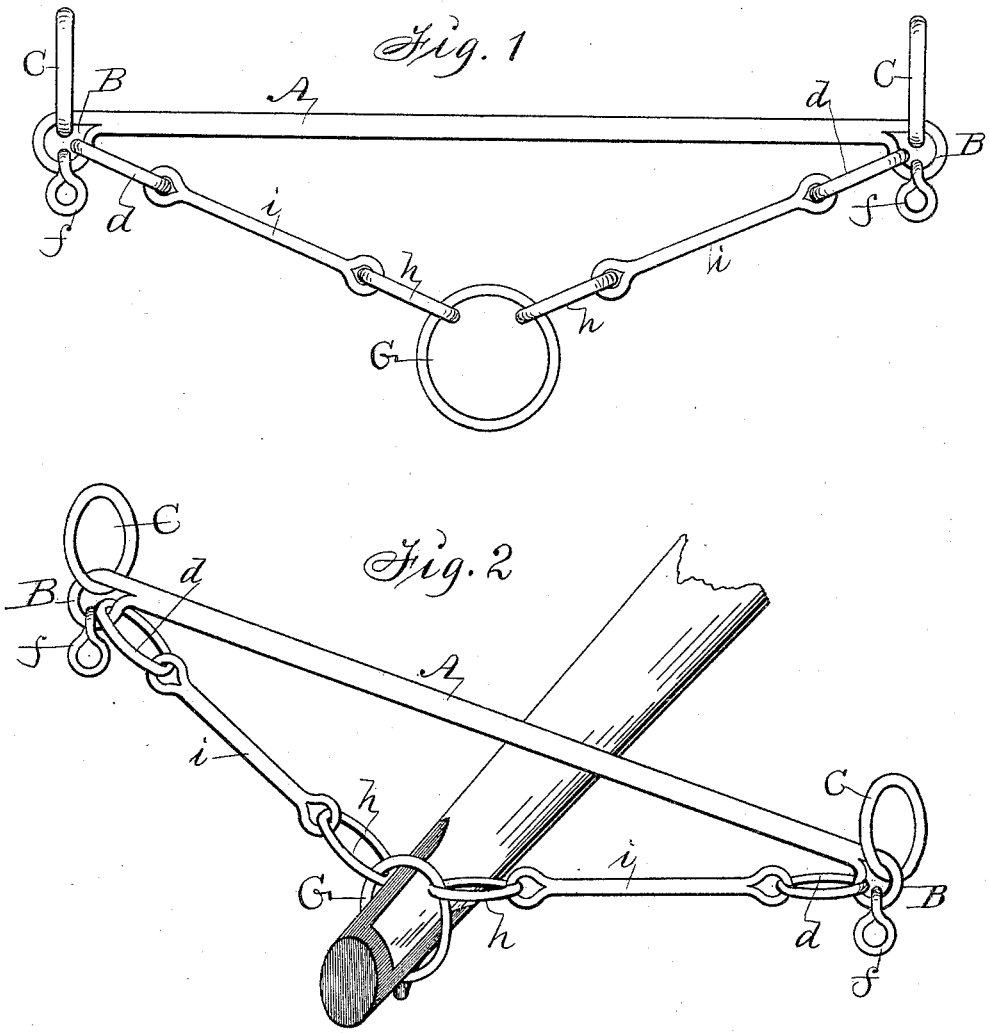

UNITED STATES PATENT OFFICE.

WILLIAM LIKES, OF OSCEOLA, IOWA.

NECK-YOKE.

SPECIFICATION forming part of Letters Patent No. 411,458, dated September 24, 1889.

Application filed March 5, 1889. Serial No. 301,969. (No model.)

*To all whom it may concern:*

Be it known that I, WILLIAM LIKES, a citizen of the United States, residing at Osceola, in the county of Clarke and State of Iowa, have invented an Improved Neck-Yoke, of which the following is a specification.

My device is one of that class adapted to be detachably connected with the front end of a wagon-pole and the harness on horses for the purpose of supporting the pole and keeping the horses a proper distance apart.

My invention consists in the manner of constructing a bar and combining rings and links therewith to produce an improved article of manufacture.

In the accompanying drawings, Figure 1 shows the complete device ready to be applied to a pole, and Fig. 2 shows it combined with a pole as required for practical use.

A is a metal bar, preferably round iron, that is drawn out at its ends to produce integral loops B, adapted to receive and retain rings C, through which straps or chains connected with harness on the horses can readily be passed, and also rings $d$ and $f$. Three such rings are placed in each of the loops before the loops are closed by welding their extremities to the bar.

G is a ring adapted to slip over the pole top on the end of the pole and to be detachably and flexibly connected with a pole, as shown in Fig. 2. It is permanently connected with the ends of the bar A by means of rings $h$, straight links $i$, and the rings $d$ in the loops B in such a manner that all the parts can be compactly folded upon the bar A to economize space in packing and shipping, and also readily adjusted and applied to a pole as required for practical use.

The rings $f$ are twisted in such a manner that they will depend from the loops and be in proper position to receive martingale straps or chains, that are connected with the harness on the horses in a common way.

I claim as my invention—

An improved neck-yoke composed of a bar A, having integral loops B, in which are inclosed rings C, $d$, and $f$, and the ring G, connected with the ends of the bar by means of rings $d$ and $h$, links $i$, and the loops B, substantially as shown and described, for the purposes stated.

WILLIAM LIKES.

Witnesses:
   A. S. JOHNSON,
   C. D. RISSLER.